Oct. 10, 1933.  C. F. SEMON ET AL  1,929,610
THERMOSTATIC LIQUID FLOW CONTROL DEVICE
Filed April 19, 1932
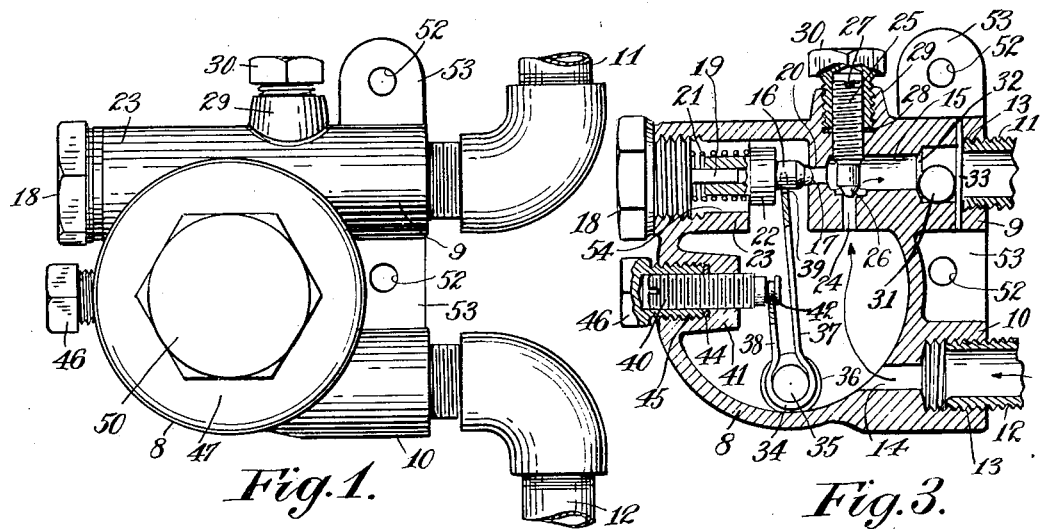
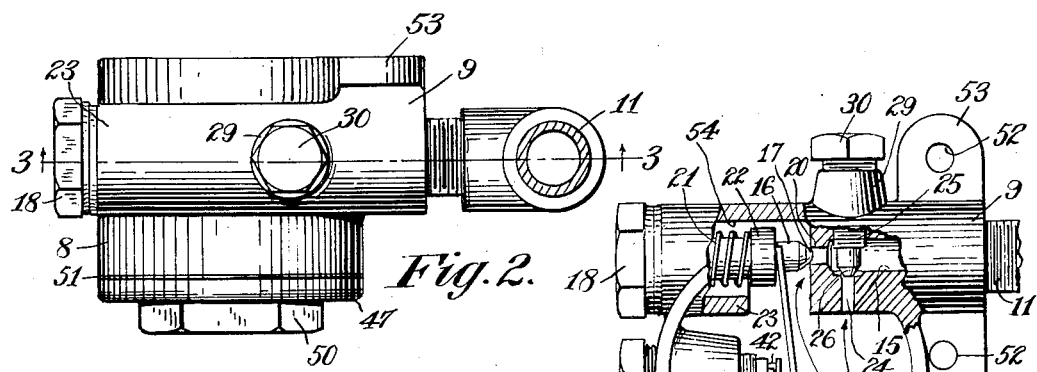
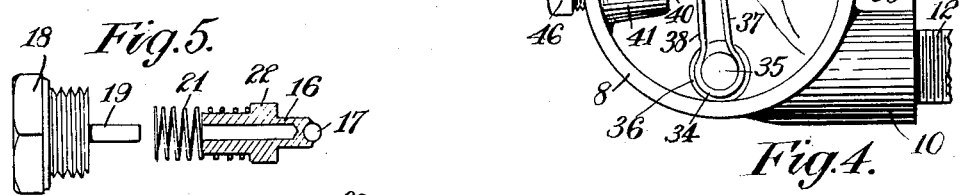
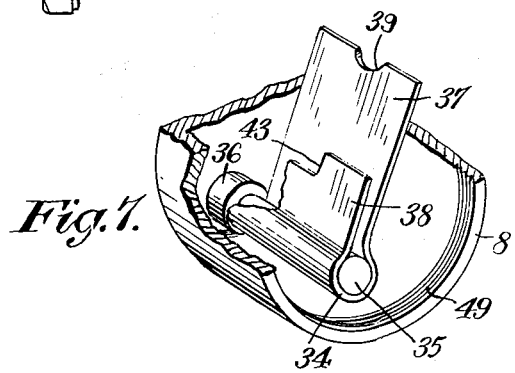
INVENTORS
Chas. F. Semon
Albert L. Semon
By John A. Seifert
ATTORNEY Patented Oct. 10, 1933

1,929,610

UNITED STATES PATENT OFFICE 1,929,610

THERMOSTATIC LIQUID FLOW CONTROL DEVICE

Charles F. Semon and Albert L. Semon, East Orange, N. J.

Application April 19, 1932. Serial No. 606,128

10 Claims. (Cl. 236—93)

This invention relates to thermostatically controlled devices for regulating the flow of cooling liquid for the refrigerant of refrigerators, the amount of liquid passing through the refrigerator being regulated by the temperature of the liquid entering the device whereby an elevation in the temperature of the liquid will effect an increase in the flow of liquid through the device and maintains the refrigerant at a predetermined uniform temperature, and it is an object of the invention to provide a thermostatic liquid flow control device which is novel in the arrangement of working parts to readily permit replacement of said working parts without disconnecting the device from the refrigerator.

It is another object of the invention to provide a device having adjustable means to vary the effect of the temperature of the liquid on the flow thereof relative to the refrigerant.

Other objects and advantages will hereinafter be set forth in detail.

The embodiment of the invention comprises a casing having an inlet port connected with the refrigerant carrying unit of the refrigerator and a source of water, and an outlet port connected to a waste conduit normally shut off from the casing by a valve releasably mounted in the casing and removable from the exterior of the casing, said valve being actuated to open the outlet port by a thermostatic member pivotally and removably supported in the casing having a portion to engage and actuate the valve upon an elevation in the temperature of the liquid in the casing and said member adapted to be adjusted exteriorly of the casing to position the valve engaging portion relative to the valve to vary the actuation of the valve by the affect of the temperature of the liquid on the thermostatic member. The casing is arranged with a removable cover plate to permit the removal of the thermostatic member from the casing for the purpose of replacement or repair.

In the drawing accompanying and forming a part of this application Figure 1 is an elevational view showing the device connected in a pipe line.

Figure 2 is a view looking at the top of Figure 1.

Figure 3 is a cross sectional view taken on the line 3—3 of Figure 2 looking in the direction of the arrows and showing the valve in closing position and the thermostatic member in normal inactive position, and arrows indicating the by-passing of a slow flow of liquid through a by-pass.

Figure 4 is a view similar to Figure 1 with the cover plate removed and part of the casing broken away to show the valve actuated by the thermostatic member to open position.

Figure 5 is a view of the valve assembly with the valve in cross section to show the structure thereof.

Figure 6 is a view of the cover plate partly broken away to show the mounting of a sealing gasket thereon; and Figure 7 is a perspective view of a portion of the casing showing the structure and pivotal mounting of the thermostatic member.

In carrying out the invention there is provided a circular casing 8 of rust resisting material having a pair of bosses 9 and 10 extending from the periphery of the casing in parallel spaced relation to each other and arranged with enlarged screw threaded portions for the releasable engagement of threaded nipples for connecting pipes 11, 12, as at 13 in Figure 3. In the present instance pipe 12 is connected to the refrigerator in communication with the source of supply of the refrigerant cooling liquid and pipe 11 leads and is connected to a disposal conduit (not shown). The boss 10 is arranged with a passage 14 of reduced diameter leading from the enlarged screw threaded portion thereof into the casing forming a restricted inlet port for the entrance if the liquid delivered by the pipe 12. It has been found that the most satisfactory results are obtainable when the passage 14 is of a diameter approximately three-sixteenths ($\frac{3}{16}$) of an inch used in a casing having a diameter of two (2) inches.

The liquid is discharged from the casing into the pipe 11 through an outlet port in the form of a passage 15 extending longitudinally through the boss 9 in communication with the enlarged threaded portion of said boss, said port being arranged with a valve seat 20 within the casing and adapted to be normally shut off from the interior of the casing by a valve comprising a member 16 having a bore extended in one end and closed at the opposite end with an arcuate recess in the exterior of said end, a ball 17 of rust proof material being forced into and retained in said recess to seat against the valve seat of the outlet port, as clearly shown in Figure 5. The valve is slidably mounted in the casing and capable of being removed from the exterior of the casing by a plug member 18 having a stem 19 of rust resisting material extended centrally therefrom to slidably engage in the bore of the valve member 16 and slidably support the valve with the ball 17 yieldingly engaged with the seat 20 at the entrance to the passage 15. The ball 17 engages the seat 20 under the influence of a spring 21 coiled about the valve stem and confined between the plug member 18 and a shoulder formed by an annular enlargement 22 of the valve member intermediate the ends thereof. The plug member 18 is releasably mounted in the casing wall by screw threads on a reduced portion of the plug member for engagement with screw threads in the outer end of an opening 54 through a boss 23 of the casing extending in alinement with the boss 9, the inner ends of said bosses terminating in spaced relation to each other to provide a clearance for and permit of longitudinal movement of the valve enlargement 22, and for a further purpose hereinafter described. The diameter of the boss opening 54 is sufficient to permit free movement of the valve stem 16, enlargement 22 and spring 21. To facilitate and limit the engagement of the plug member 18 in the opening 54 the outer end of the plug is arranged with an enlarged hexagonal head for the application of a wrench or similar tool for tightening the plug in the casing opening 54 and a sealing washer may be interposed between the head of the plug 18 and the outer end of the boss 23 to prevent leakage around the plug.

To prevent overheating of the refrigerant a steady slow flow of the cooling liquid is maintained through the casing 8, by providing a by-pass for the liquid from the casing to the outlet port, in the form of a restricted port or passage 24 extended through the wall portion of the boss 9 in the casing, as clearly shown in Figures 3 and 4, said passage 24 communicating with the interior of the casing and the passage 15 intermediate the valve seat 20 and the enlarged threaded portion 13. The flow of liquid through the by-pass is regulated by a manually adjustable valve in the form of stem screw-threaded for the greater portion of its length, as at 25, for the releasable engagement in a screw threaded opening through the wall of boss 9 in axial alinement with the by-pass 24, so that the inner end of the stem, being of conical form, as at 26, may readily engage a seat at the end of the by-pass in the wall of the outlet passage in boss 9. To facilitate adjustment of the valve 26 toward and away from the valve seat of by-pass 24, the outer end of valve stem is arranged with a screw driver slot 27, and to prevent seepage of liquid past the valve stem, a gasket 28 of packing material is engaged around said valve within an enlargement of the valve opening extended through a boss 29 projecting from the exterior of the casing and internally screw threaded for the releasable engagement of a cap nut 30 adapted to be forcedly engaged with the gasket 28 to maintain it in liquid tight sealing position, and prevent the accumulation of foreign substance about the valve 26. Upon adjustment of the valve 26 in predetermined spaced relation to the valve seat of by-pass 24, there will be a predetermined slow flow of liquid from pipe 12 to and through the casing, and from the outlet passage 15 to the pipe 11, as indicated by the arrows in Figure 3, although the flow of liquid from the casing through the outlet passage 15 is shut off by the valve 16.

To prevent back flow of the liquid from the pipe 11 for any reason, such as the blocking of the pipe 11 by refuse or waste, a check valve is provided at the outlet side of the outlet passage 15 closing into and opening outward from the casing, shown as comprising a ball 31 of a diameter larger than the diameter of the passage 15 to engage a seat in the form of an enlargement 32 at the juncture of the passage 15 with the threaded enlargement 13 of the boss 9, and retained relative to said seat by a pin 33 fixed at the opposite ends in said boss adjacent the juncture of the ball seat 32 and passage enlargement 13, whereby the flow of liquid from the casing is not retarded but back pressure of the liquid will seat the ball against the seat 32 and shut off back flow of the liquid.

Should the refrigerant reach a predetermined temperature the cooling liquid discharged from the refrigerator and entering the casing 8 will be elevated to approximately the same temperature and will actuate the valve 16 to open position by the operation of a thermostatic member pivotally supported within the casing and comprising a bimetallic strip of U shape having a connecting or intermediate portion 34 of arcuate or circular form loosely engaged on a post 35 fixed in a boss 36 projecting from a flat side of the inner wall of the casing adjacent the peripheral wall thereof, and extended parallely of the axis of the circular wall portion of the casing, so that the thermostatic member will have movement about said post. One leg portion 37 of said thermostatic member is of approximately twice the length of the other leg portion 38 of the member and has an arcuate recess 39 in the free end for the slidable engagement of the reduced portion of the valve 16 extended from the annular enlargement 22 and carrying the ball 17. The valve 16 is actuated to unseat the ball from the seat 20 of the passage 15 through the contracting of the legs 37, 38 together effected by an elevation in temperature of the liquid in the casing, the movement thus imparted to the leg 37 causing the recessed end of said leg 37 to abut against the enlargement 22 of and move the valve 16 to open position, as shown in Figure 4, by anchoring the leg 38 in the casing. The leg 38 is adjustably anchored by a member in the form of a set screw 40 threadedly engaged in a screw threaded opening in a boss 41 extended into the casing adjacent the boss 23 for the valve carrying plug 18, and the inner end of the screw 40 being arranged with an annular groove 42 for the releasable engagement of the edges of a cut-away portion 43 in the free end of the leg 38 at one side thereof, whereby the leg 38 is anchored against movement permitting only the leg 37 to move toward leg 38 by the contracting force exerted on the two legs of the thermostatic member effected by an elevation in temperature of the liquid in the casing. The actuation of the valve 16 may be varied so that the valve is opened by a range of predetermined degrees of temperature of the liquid in the casing to correspond with the regulated rate of operation of the refrigerant. This variation of the actuation of the valve is accomplished by positioning the arcuate recessed end of the leg 37 in various spaced positions relative to the valve enlargement 22 through the actuation of the set screw 40 into and out of the casing and the consequent adjustment of the thermostatic member to predetermined positions about the post 35.

The mounting of the set screw in the boss 41 is rendered leak proof by a gasket of packing material 44 engaged around the screw and in an enlargement 45 formed in said boss 41, and the gasket is retained in position by a cap nut 46 threadedly engaged in the recess, as shown in Figure 3, said nut 46 also preventing the accumulation of foreign substance about the set screw and tampering with the adjusted position of the anchoring set screw 40.

It will readily be seen that the different working parts of the device may be easily removed from the casing 8 without disconnecting the casing from the pipes 11 and 12. The valve 16 and its assembly may be removed by detaching the plug member 18, and the valve 26 may be removed by removing the nut 30. To remove the adjustable anchoring screw 40 it is necessary to first remove the thermostatic member for which purpose the lateral side of the casing 8 opposite the side arranged with the boss 36 is open and adapted to be closed by a removable cover plate 47 having a reduced externally screw threaded portion 48 for the releasable engagement with screw threads on the interior wall of the casing, as at 49 in Figure 7, and the exterior face of said plate being arranged with a hexagonal shaped protuberance 50 for the application of a tool, such as a wrench, to tighten the cover plate and impinge a washer 51 of packing material engaged on and with the shoulder formed by the reduced portion of the plate against the outer edge of the casing opening to provide a liquid tight joint. To permit of easy removal of the thermostatic member tension on the arcuate recessed end of the leg 37 is released by the removal of the valve 16 from the casing.

The casing 8 is mounted upon any suitable support by securing means, such as screws, (not shown) engaged in perforations 52 of ears 53 integral with and extended from the casing in the plane of the end wall of the casing having the boss 36.

Variations may be made in construction and arrangement of parts without departing from the scope of the invention, and portions of the invention may be used without others and come within the scope of the invention.

Having thus described our invention we claim:

1. In a thermostatic liquid flow control device, a casing having liquid inlet and outlet ports, a valve mounted in the casing and yieldingly urged to normally close the outlet port, a thermostatic member of U-shape pivotally supported intermediate the ends thereof in the casing with a leg portion of said member engaging the valve and adapted by variations in temperature of liquid in the casing to actuate the valve to open the outlet port, and means adjustably mounted in the casing to have movement into and out of the casing to engage the other leg portion of the thermostatic member and adjust the position of the first mentioned leg portion relative to and vary the actuation of the valve by the effect of the temperature of the liquid on the thermostatic member.

2. In a thermostatic liquid flow control device, a casing having liquid inlet and outlet ports, a valve having a stem to slidably mount the valve in the casing and yieldingly urged to close the outlet port, a U-shaped thermostatic member having leg portions of different lengths and pivotally supported intermediate the ends thereof in the casing with the leg portion of greater length slidably connected to the valve, the latter leg portion being adapted to actuate the valve in a direction from the outlet opening by variations in the temperature of the liquid in the casing, and means adjustably mounted in the casing to engage the shorter leg portion of the thermostatic member and adjust said member about its pivot support and alter the connection of the longer leg with the valve to vary the actuation of the valve by the effect of the temperature of the liquid on the thermostatic member.

3. In a thermostatic liquid flow control device, a casing having liquid inlet and outlet ports with a valve seat arranged at the interior of the outlet port, a valve carried by the casing and yieldingly urged toward the outlet port to normally engage the valve seat of and close the outlet port, a by-pass from the casing to the outlet port beyond the valve seat to effect a slow flow of liquid through the casing, means adjustably mounted in the casing wall and adjustable from the exterior of the casing to vary the area of and flow of liquid through the by-pass, a U-shaped thermostatic member pivotally supported intermediate the ends thereof in the casing, one leg of said member having a connection with the valve and responsive to variations in the temperature of the liquid in the casing to actuate the valve to open position, and means adjustably mounted in the casing wall connected with the other leg of the thermostatic member to adjust the thermostatic member about its pivot support and alter the connection of the first mentioned leg with the valve to vary the actuation of the valve by the effect of the temperature of the liquid on the thermostatic member.

4. In a thermostatic liquid flow control device, a casing having liquid inlet and outlet ports, a valve slidably mounted in the casing and yieldingly urged to normally close the outlet port, a post fixed at one end in a wall of the casing and extended into the casing, a U-shaped thermostatic member loosely mounted on the post at the U portion thereof with one leg of said member engaging the valve and responsive to variations in the temperature of the liquid in the casing to actuate the valve to open position, and means adjustably mounted in a wall of the casing to have movement into and out of the casing and connected with the other leg of the thermostatic member to adjust said member to predetermined positions about the post and alter the position of the first mentioned leg of the thermostatic member relative to the valve to vary the actuation of the valve by the effect of the temperature on the thermostatic member.

5. In a thermostatic liquid flow control device, a casing having liquid inlet and outlet ports, a valve comprising a stem arranged with an annular enlargement slidably mounted in the casing and yieldingly urged to normally close the outlet port, a post extending transversely of the casing, and a thermostatic member having parallel leg portions and an intermediate portion of arcuate formation loosely engaged on the post to support said member with one leg slidably engaging the valve stem and movable by variations in the temperature of the liquid in the casing to abut the annular enlargement of the valve stem and move the valve to open position.

6. In a thermostatic liquid flow control device, a casing having liquid inlet and outlet ports, a plug releasably engaged in an opening in the wall of the casing in alinement with the outlet port and having a protuberance extended into the casing, a valve having a stem slidably mounted on the plug protuberance and arranged with an annular enlargement, a spring coiled about the valve stem between the plug and annular valve enlargement to urge the valve to normally close the outlet port, and a thermostatic member of U-shape pivotally supported intermediate the ends thereof in the casing to extend transversely thereof with an end portion slidably engaging the valve and movable by an elevation in temperature of the liquid in the casing to abut the annular enlargement of the valve and actuate the valve to open position.

7. In a thermostatic liquid flow control device, a casing having liquid inlet and outlet ports through parallelly arranged bosses extended from the periphery of the casing, a valve slidably mounted in the casing and yieldingly urged to normally close the outlet port, a thermostatic member of U-shape pivotally supported in the casing to extend transversely thereof and having the leg portions arranged of different lengths with the leg of greater length slidably engaging the valve and adapted to actuate the valve to open position by an elevation in the temperature of the liquid in the casing, and a member threaded into an opening in the casing wall opposite the inlet and outlet ports to extend into the casing and having a releasable connection with the shorter leg of the thermostatic member to adjust said member on its pivot support and position the leg of greater length in predetermined relation to the valve to vary the actuation of the valve by the effect of the temperature on the thermostatic member.

8. A thermostatic liquid flow control device as claimed in claim 7, wherein the valve is arranged with a ball face and an annular enlargement intermediate the ends of the valve for the engagement of the thermostatic member during the valve actuating movement thereof.

9. In a thermostatic liquid flow control device, a casing having liquid inlet and outlet ports with the outlet port arranged with an annular enlargement exterior of the casing and a valve seat interiorly of the casing, a valve slidably mounted in the casing and yieldingly urged to normally engage the valve seat of and close the outlet port, a check valve in the annular enlargement of the outlet port closing into and opening outward from the casing to prevent back flow through the outlet port, a by-pass from the interior of the casing to the outlet port intermediate the valve seat and check valve, and a thermostatic member of U-shape supported at the juncture of the legs in the casing adjacent the inlet port with one leg anchored in the casing and the other leg slidably engaging the valve and adapted to open the valve by an elevation in temperature of the liquid in the casing.

10. In a thermostatic liquid flow control device, a casing having liquid inlet and outlet ports, a valve having a stem arranged with an annular enlargement slidably mounted in the casing and yieldingly urged to normally close the outlet port, a post fixed in the casing to extend transversely thereof and adjacent the inlet port, a thermostatic member having parallel legs of different lengths and an arcuate eye intermediate the legs whereby said member is loosely engaged and supported on the post, the free end of the leg of greater length being arranged with an arcuate recess to slidably engage the valve stem and adapted to abut the annular enlargement of the valve upon an elevation in temperature of the liquid in the casing and actuate the valve to open position, and the free end of the leg of less length having a portion at one side cut away, and a member threaded into an opening in the wall of the casing opposite the inlet and outlet ports and extended into the casing with the inner end arranged with an annular groove for engagement at the edge of the cut away portion of the leg of less length of the thermostatic member to adjust said member to predetermined positions about the post and position the recessed end of the leg of greater length in spaced relation to the annular enlargement of the valve to vary the actuation of the valve by the effect of the temperature on the thermostatic member.

CHARLES F. SEMON.
ALBERT L. SEMON.